United States Patent [19]

Murano et al.

[11] Patent Number: 4,964,317
[45] Date of Patent: Oct. 23, 1990

[54] HYDRAULIC CONTROL METHOD FOR CONTINUOUSLY VARIABLE SPEED CHANGE GEAR MECHANISM FOR A VEHICLE AND A DRIVE CONTROL METHOD FOR A PRESSURE VALVE THEREOF

[75] Inventors: Katsuaki Murano; Sadayuki Hirano, both of Hamamatsu; Yoshinori Yamashita, Hamana; Takumi Tatsumi; Hiroaki Yamamoto, both of Himeji, all of Japan

[73] Assignees: Suzuki Jidosha Kogyo Kabushiki Kaisha, Shizuoka; Mitsubishi Denki Kabushiki Kaisha, Tokyo, both of Japan

[21] Appl. No.: 229,942

[22] Filed: Aug. 8, 1988

[30] Foreign Application Priority Data

Aug. 10, 1987 [JP] Japan .................. 62-199420
Oct. 31, 1987 [JP] Japan .................. 62-274746
Dec. 10, 1987 [JP] Japan .................. 62-310815

[51] Int. Cl.$^5$ ............................................. B60K 41/18
[52] U.S. Cl. ........................................ 74/844; 474/22
[58] Field of Search ...................... 74/844; 474/22; 192/82 T; 251/129.08

[56] References Cited

U.S. PATENT DOCUMENTS 4,779,489 10/1988 Haley .................................. 74/844

FOREIGN PATENT DOCUMENTS 57-186656 11/1982 Japan .
59-77159 2/1984 Japan .
59-43249 10/1984 Japan .
61-233256 10/1986 Japan .

Primary Examiner—Dirk Wright
Attorney, Agent, or Firm—Flynn, Thiel, Boutell & Tanis

[57] ABSTRACT

A hydraulic control method is applied to a continuously variable speed change gear mechanism including a pulley having a fixed pulley member fixed to a rotary shaft and a movable pulley member movable by oil pressure toward and away from the fixed pulley member so that a groove width between the fixed and movable pulley members is decreased or increased to thereby reduce or increase the effective rotational radius of a belt extending between the pulley members and thus change a change gear ratio and control the gear change. In this method, first to third three-way electromagnetic pressure control valves control the oil pressure and an electronic control unit (ECU) controls the electromagnetic valves, and driving frequencies of the valves are switched by the ECU in accord with the oil temperature and/or vehicle speed so that the hydraulic clutch is smoothly and effectively operated, the lifetime of the electromagnetic valves is extended, and vibration of the vehicle body due to pressure fluctuation in the hydraulic circuit is prevented.

17 Claims, 11 Drawing Sheets

HYDRAULIC CONTROL METHOD FOR CONTINUOUSLY VARIABLE SPEED CHANGE GEAR MECHANISM FOR A VEHICLE AND A DRIVE CONTROL METHOD FOR A PRESSURE VALVE THEREOF

CROSS REFERENCE TO RELATED APPLICATIONS

This application is related to our copending applications filed concurrently herewith and entitled (1) METHOD OF CONTROLLING CONTINUOUSLY VARIABLE TRANSMISSION SYSTEM (U.S. Ser. No. 07/229,899), (2) METHOD OF CONTROLLING CLUTCH OF CONTINUOUSLY VARIABLE, TRANSMISSION SYSTEM (U.S. Ser. No. 07/229,909), (3) METHOD OF CONTROLLING LINE PRESSURE OF CONTINUOUSLY VARIABLE TRANSMISSION SYSTEM (U.S. Ser. No. 07/229,900), (4) METHOD OF CONTROLLING CLUTCH PRESSURE OF CONTINUOUSLY VARIABLE TRANSMISSION SYSTEM (U.S. Ser. No. 07/229,893). The disclosures of these copending applications are incorporated herein by reference.

FIELD OF THE INVENTION

The present invention relates to a hydraulic control method for a continuously variable speed change gear mechanism and, more particularly, to such a method in which, by switching a driving frequency of a pressure control valve arrangement in order to change a hydraulic pressure in accord with an oil temperature of a hydraulic circuit, a proper oil pressure is assured even at low temperatures where oil viscosity is large, and a clutch pressure and the like are suitably maintained, thereby enabling operability to be improved, and further relates to a pressure valve drive control method for such a mechanism in which, by switching a driving frequency of a pressure control valve arrangement in order to change an oil pressure in accord with vehicle velocity, the durability of the pressure control valve arrangement in a high speed mode is improved and vibration of the vehicle body due to pressure fluctuation in a low speed running mode is prevented.

Further, the invention relates to a line pressure control method of a continuous variable speed change gear and, more particularly, to a line pressure control method of a continuous variable speed change gear in which a line pressure is raised at low temperatures to thereby enable the clutch control to be performed, a drive feeling at low temperatures is made good, and a chain slip due to the lack of the line pressure in the driving mode can be prevented.

BACKGROUND OF THE INVENTION

In vehicles, a change gear mechanism exists between an internal combustion engine and the driving wheels. The change gear mechanism functions to change driving forces applied to the driving wheels and to change a vehicle speed in accord with running conditions of the vehicle, which running conditions change within a wide range, thereby optimizing the performance of the internal combustion engine. As one form of change gear mechanism, for example, there is a continuously variable speed change gear mechanism in which a pulley includes a fixed pulley member fixed to a rotary shaft and a movable pulley member supported on the rotary shaft so as to be movable axially toward and away from the fixed pulley member under oil pressure control so that a width between the fixed and movable pulley members of this pulley is decreased or increased, thereby reducing or increasing the effective rotational radius for a belt extending around the pulley, so that a motive power is propagated, and so that a change gear ratio (or belt ratio) is changed. This type of continuously variable speed change gear mechanism has been disclosed in, for instance, Japanese Publication Nos. 57-186656, 59-43249, 59-77159, and 61-233256.

In effecting control of the continuously variable speed change gear mechanism so that the change gear ratio is changed using oil pressure as mentioned above, the line pressure of the hydraulic circuit, the primary pressure which acts on the movable pulley member in order to actually change the change gear ratio, and the clutch pressure which acts on the hydraulic clutch are classified into five kinds of control modes, including a neutral mode, a hold mode, a normal start mode, a special start mode, and a driving mode, as shown in Table 1. These pressures are variously controlled by open loop control, closed loop control, and/or a duty ratio in which an output value is constant.

TABLE 1

Control mode and duty output

| | Control Mode | | | | |
|---|---|---|---|---|---|
| | Neutral | Hold | Normal Start | Special Start | Drive |
| Line | 0% | 25% | Open Loop 25-95% | Open Loop 25-95% | Closed Loop 5-95% |
| Ratio | 0% Or Closed Loop | 0% Or Closed Loop | 0% | Closed Loop 5-95% | Closed Loop 5-95% |
| Clutch | 100% | Closed Loop 5-95% | Closed Loop 5-95% | Closed Loop 5-95% | 0% |

OPEN LOOP: Pressure, rotational speed, etc. are not fed back.
CLOSED LOOP: Pressure, rotational speed, and ratio are fed back A pressure control valve arrangement which includes an electromagnetic valve and the like for controlling a frequency of the duty output value, and thus an oil pressure of the hydraulic circuit, is driven at a relatively high frequency of 100 Hz in order to smooth the control characteristic of the hydraulic clutch, in particular in order to suppress and lower the vibration which is generated when the hydraulic clutch is slid and coupled.

However, the viscosity of oil in the hydraulic circuit is high at low temperatures (for example, −10° C. or less). Therefore, when a driving frequency of the pressure control valve arrangement is set to 100 Hz, it is impossible at low temperatures to obtain an output pressure of the electromagnetic valve sufficient to drive a change gear control valve of the pressure control valve arrangement. Therefore, even if a driver tries to start movement of the vehicle, the clutch pressure and the like are not set to proper values, so that there occurs an inconvenience in that the connection of the hydraulic clutch becomes defective and the vehicle movement cannot be smoothly started.

However, when the pressure control valve arrangement is driven at the driving frequency of 100 Hz, there occurs an inconvenience in that the durability of the pressure control valve arrangement deteriorates.

On the other hand, if the driving frequency is switched to the frequency of 50 Hz in a low speed running mode at ordinary or high temperatures, a pressure in the hydraulic circuit fluctuates so that there occurs an inconvenience in that this pressure fluctuation results in vibration of the vehicle body and imparts an unpleasant feeling to the driver and passengers.

On the other hand, there is known a continuous variable speed change gear having a hydraulic clutch for intermittently connecting and disconnecting a motive power by an oil pressure. This hydraulic clutch is controlled in various kinds of control modes on the basis of the signals indicative of the engine speed, opening degree of a throttle valve of a carburetor, and the like.

In the conventional line pressure control method, when a vehicle is first actuated (or in other words moved) after the engine starting operation was performed at low or super low temperatures, there is an inconvenience such that the line pressure does not rise as shown in FIG. 10.

Therefore, the clutch pressure does not reach a necessary value and the clutch control cannot be performed, so that the engine speed increases too high and the engine torque is not transferred to the wheels. The clutch is not come into engagement. Finally, there is an inconvenience such that the operating mode cannot be shifted from the normal starting mode.

On the other hand, as shown in FIG. 11, in the conventional line pressure control in the normal starting mode, an object line pressure ($P_{LINSP}$ or $P_{LIN}$) is determined in accordance with the opening degree of a throttle valve. A line pressure solenoid drive duty ($D_{LIN}$) which is necessary to obtain the object line pressure is read out of a map (OLSCHD). therebY performing the open loop control to drive a solenoid on the basis of the drive duty ratio. At this time, the feedback control of the line pressure is not executed.

Therefore, by controlling the line pressure by the open loop control, the insufficient increase in line pressure at low temperatures cannot be corrected and the clutch control cannot be performed. Thus, there are inconveniences such that the drive feeling at low temperatures deteriorates, a chain slip occurs in the driving mode, and the safety deteriorates.

SUMMARY OF THE INVENTION

It is a first object of the present invention to eliminate the foregoing inconveniences in the conventional techniques and to provide a hydraulic control method for a continuously variable speed change gear mechanism in which, by switching a driving frequency of a pressure control valve arrangement for controlling an oil pressure in accord with an oil temperature, a proper oil pressure is assured even at low temperatures and a clutch pressure and the like are maintained at proper values, thereby enabling the operability to be improved.

This object is accomplished according to one aspect of the present invention in a continuously variable speed change gear mechanism in which a pulley includes a fixed pulley member fixed to a rotary shaft and a movable pulley member supported for axial movement toward and away from the fixed pulley member under oil pressure control so that a groove width between the fixed and movable pulley members is decreased or increased, thereby reducing or increasing the effective rotational radius of a belt extending between these pulley members, thereby changing a change gear ratio, and thereby controlling the speed change. The invention is characterized by the provision of a pressure control valve arrangement for controlling the oil pressure and a control unit to make the pressure control valve arrangement operative or inoperative, and by the driving frequency of the pressure control valve arrangement being switched by the control unit in accord with the oil temperature.

According to this method of the invention, although the oil viscosity is high at low temperatures and at a low oil temperature, the pressure control valve arrangement is driven at different frequencies so as to obtain an oil pressure sufficient to, for example, reliably make a hydraulic clutch operative even at low temperatures. Slippage in the hydraulic clutch or the like can be avoided, vehicle movement can be easily started, and the operability can be improved. In addition, although the oil viscosity decreases with an increase in oil temperature, the pressure control valve arrangement is driven at a predetermined frequency so as to derive a proper oil pressure in accord with the oil temperature, so that the function of the hydraulic clutch can be properly realized.

A second object of the invention is to provide a pressure valve drive control method for a continuously variable speed change gear mechanism for a vehicle in which, by switching a driving frequency of a pressure control valve arrangement controlling an oil pressure in accord with a vehicle velocity, the durability of the pressure control valve arrangement can be improved in a high speed running mode and vibration of the vehicle body due to a pressure fluctuation in the low speed running mode can be prevented.

This object is accomplished according to another aspect of the invention in a continuously variable speed change gear mechanism for vehicles in which a pulley includes a fixed pulley member fixed to a rotary shaft and a movable pulley member supported for axial movement toward and away from the fixed pulley member under oil pressure control so that a groove width between the fixed and movable pulley members is decreased or increased, thereby reducing or increasing an effective rotational radius of a belt extending between these pulley members, thereby changing a change gear ratio, and thereby controlling a change gear. This invention is characterized by the provision of a pressure control valve arrangement for controlling the oil pressure, a vehicle velocity detecting arrangement for detecting a velocity of the vehicle, and a control unit to drive the pressure control valve arrangement in accord with an oil temperature, and by a driving frequency of the pressure control valve arrangement being switched by the control unit in accord with a vehicle velocity detection signal from the vehicle velocity detecting arrangement.

According to this method of the invention, the driving frequency of the pressure control valve arrangement is switched in accord with the vehicle velocity, thereby improving the durability of the pressure control valve arrangement in a high speed running mode and also preventing vibration of the vehicle body due to pressure fluctuation in a low speed running mode.

The above and other objects and features of the present invention will become apparent from the following detailed description and the appended claims, with reference to the accompanying drawings.

The third object of the invention is to provide a line pressure control method of a continuous variable speed change gear in which an oil temperature is detected when the operating mode is shifted from the holding mode to the starting mode, when the oil temperature is a predetermined temperature or less, a duty for a line pressure is increased to thereby raise the line pressure, so that the line pressure at low temperatures can be increased and the clutch control can be performed, a drive feeling at low temperatures can be made good, a chain slip due to the insufficient line pressure in the driving mode can be prevented, and the safety can be improved.

To accomplish this object, according to still another aspect of the invention, there is provided a line pressure control method of a continuous variable speed change gear in which a pulley has a fixed pulley member fixed to a rotary shaft and a movable pulley member attached to the fixed pulley member so as to come into contact with and removed from this fixed pulley member, a groove width between both of the fixed and movable pulley members of the pulley is decreased or increased by an oil pressure thereby reducing or increasing a rotational radius of a belt wound between these pulley members and changing a change gear ratio, and thereby controlling the speed change, this invention is characterized in that an oil temperature is detected when the operating mode is shifted from the holding mode to the starting mode, and when the oil temperature is a predetermined temperature or less, a duty for a line pressure is increased, thereby raising the line pressure.

According to the method of the invention, the oil temperature is detected when the operating mode is shifted from the holding mode to the starting mode, and when the oil temperature is a predetermined temperature or less, the duty for a line pressure is increased to thereby raise the line pressure, and the line pressure at low temperatures is increased, thereby enabling the clutch control to be performed and the drive feeling at low temperatures can be made good. The chain slip due to the insufficient line pressure in the driving mode can be prevented and the safety is improved.

BRIEF DESCRIPTION OF THE DRAWINGS

FIGS. 1 to 6 show a first embodiment and FIGS. 7 to 9 show a second embodiment of the present invention, in which:

FIG. 1 a flowchart depicting a hydraulic control method embodying the invention;

FIG. 2 is a diagram of the format of a FLG register used in the method of FIG. 1;

FIG. 3 is a graph showing output pressure characteristics of an electromagnetic valve with respect to a driving frequency;

FIG. 4 is a schematic block diagram of a hydraulic circuit, a control unit, and a continuously variable speed change gear mechanism suitable for implementing the method of FIG. 1;

FIG. 5 is a cross sectional view of a primary pressure control valve which is a component of the hydraulic circuit of FIG. 4;

FIG. 6 is a cross sectional view of a three-way electromagnetic valve which is a component of the hydraulic circuit of FIG. 4;

FIG. 7 is a diagrammatic fragmentary view of part of a continuously variable speed change gear mechanism;

FIG. 8 is a schematic block diagram similar to FIG. 4 of a hydraulic circuit, a control unit, and a continuously variable speed change gear mechanism of the type shown in FIG. 7;

FIG. 9 is a flowchart depicting a hydraulic control method which is dependent on vehicle velocity and embodies the invention.

FIG. 10 is a time chart for a line pressure control of a continuous variable speed change gear of the belt drive type;

FIG. 11 is a block diagram for the line pressure control of the continuous variable speed change gear;

FIG. 12 is a diagram showing the relations among the drive duty ratio at an ordinary temperature, the object clutch pressure, and the solenoid pressure;

FIG. 13 is a diagram showing the relations among the drive duty ratio at super low temperatures of $-25°$ C. or less, the object clutch pressure, and solenoid pressure; and FIG. 14 is a flowchart for a line pressure control method.

DETAILED DESCRIPTION

A first embodiment of the present invention will be described in detail hereinbelow with reference to the drawings.

Figure 2:
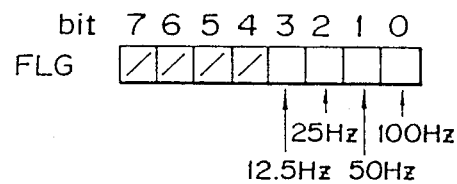
Figure 3:
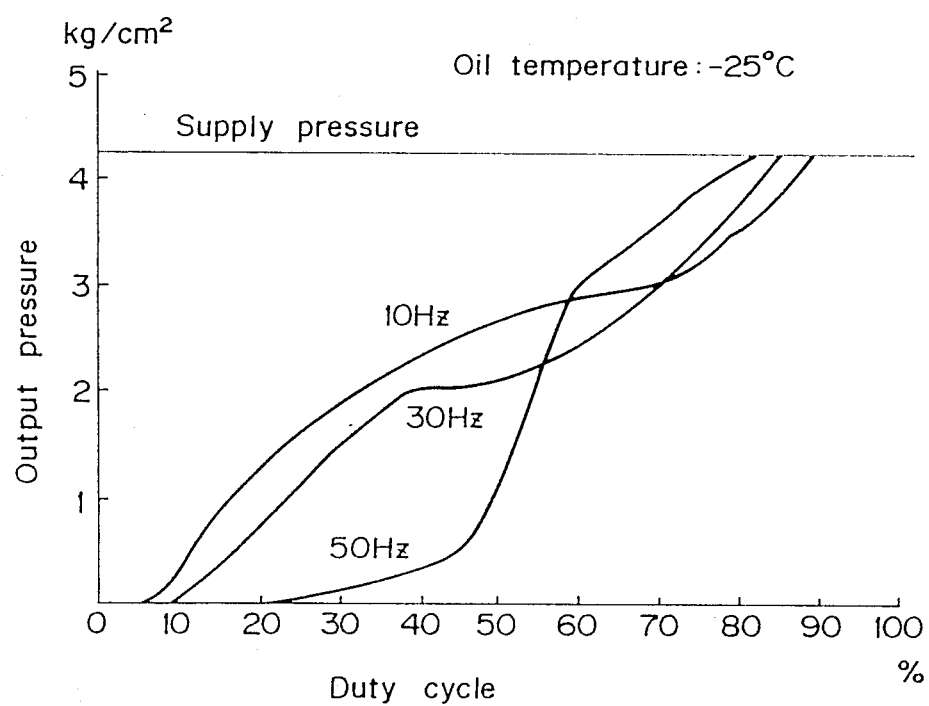
Figure 4:
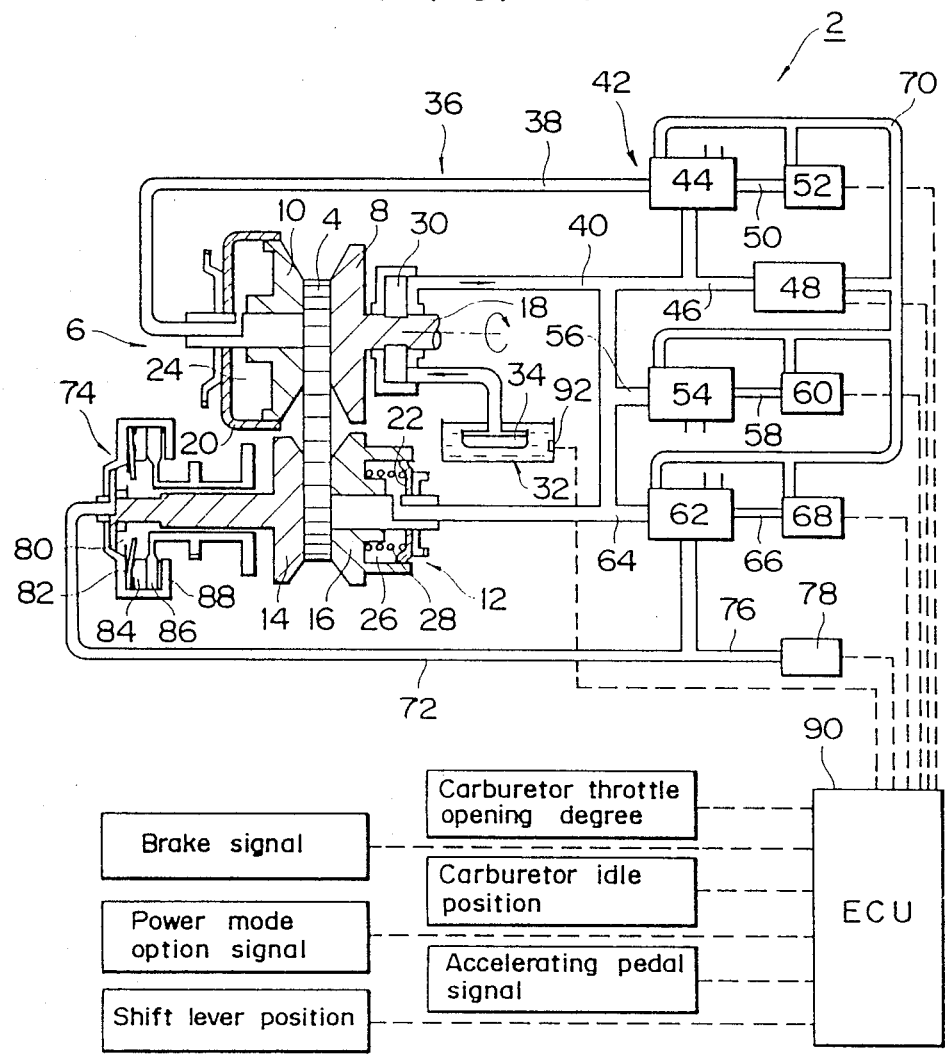

FIGS. 1 to 6 show the first embodiment of the invention. continuously variable speed change gear mechanism; 4 indicates a belt; 6 a pulley on the driving side; 8 a fixed pulley member on the driving side; 10 a movable pulley member on the driving side; 12 a pulley on the driven side; 14 a fixed pulley member on the driven side; and 16 a movable pulley member on the driven side. As shown in FIG. 4, the driving side pulley 6 includes the driving side fixed pulley member 8 which is fixed to a rotary shaft 18, and includes the driving side movable pulley member 10 which is supported on the rotary shaft 18 so that it is movable in an axial direction on the shaft 18 but is not rotatable. The driven side pulley 12 includes the driven side fixed pulley member 14 which is fixed to the rotary shaft 18 and the driven side movable pulley member 16 which is axially movably supported in a manner similar to the driving side pulley 10.

A first housing 20 is associated with the driving side movable pulley member 10, thereby forming a first hydraulic chamber 24. A second housing 22 is associated with the driven side movable pulley member 16, thereby forming a second hydraulic chamber 26. A pressing spring 28 is provided in the second hydraulic chamber 26 on the driven side, thereby urging the driven side movable pulley member 16 leftwardly toward the driven side fixed pulley member 14.

An oil pump 30 is provided on the rotary shaft 18. The oil pump 30 supplies oil from an oil pan 32 through an oil filter 34 into the first and second hydraulic chambers 24 and 26 by way of a passage 40, valves 44 and 62, and a first oil passage 38 and second oil passage 40. A hydraulic circuit 36 includes the first and second oil passages 38 and 40. A primary pressure control valve 44 serving as a speed change control valve which is part of pressure control valve means 42 is provided between the passage 40 and the first oil passage 38, thereby controlling a primary pressure as an input shaft sheave pressure. On the other hand, a constant pressure control valve 48 takes (through a third passage 46) the line pressure in passage 40 (which is generally set to a value within a range from 5 to 25 kg/cm$^2$) and produces in a passage 70 a constant pressure (which is set to a value within a range from 4.0 to 5.0 kg/cm$^2$). Further, a first three-way electromagnetic valve 52 to control a primary pressure communicates with the primary pressure control valve 44 through a fourth oil passage 50.

A line pressure control valve 54 having a by-pass valve function to control the line pressure in passage 40 as a pump pressure communicates with the second oil passage 40 through a fifth oil passage 56. A second three-way electromagnetic valve 60 to control the line pressure communicates with the line pressure control valve 54 through a sixth oil passage 66.

Further, a clutch pressure control valve 62 to control a clutch pressure in a passage 72 communicates through a seventh oil passage 64 with the second oil passage 40 on the side of the second hydraulic chamber 26. A third three-way electromagnetic valve 68 to control the clutch pressure communicates with the clutch pressure control valve 62 through an eighth oil passage 66.

The primary pressure control valve 44, first electromagnetic valve 52 to control the primary pressure, constant pressure control valve 48, second three-way electromagnetic valve 60 to control the line pressure, and clutch pressure control valve 62 all communicate with a ninth oil passage 70.

The clutch pressure control valve 62 communicates with a hydraulic clutch 74 through the tenth oil passage 72. A pressure sensor 78 is connected to the tenth oil passage 70 through an eleventh oil passage 76. The pressure sensor 78 can directly detect the oil pressure controlling the clutch pressure in various kinds of operating modes such as a hold mode, a start mode and the like, and has a function to help set the detected oil pressure to an object or desired clutch pressure. On the other hand, since the clutch pressure is normally almost equal to the line pressure in a driving mode, the pressure sensor 78 can contribute to line pressure control.

The hydraulic clutch 74 includes a piston 80, a ring-shaped spring 82, a first pressure plate 84, a friction plate 86, a second pressure plate 88, and the like.

An electronic control unit (ECU) 90 is provided, and is preferably a conventional microprocessor. The ECU 90 receives detection signals indicative of various kinds of conditions such as the throttle opening degree of a carburetor (not shown), the engine rotational speed and the like for a vehicle and then changes a duty ratio of a control signal, thereby controlling a gear change. Opening and closing operations of the first three-way electromagnetic valve 52, constant pressure control valve 48, second three-way electromagnetic valve 60, and third three-way electromagnetic valve 68 are controlled by the ECU 90. The pressure sensor 78 is coupled to the ECU. The various kinds of signals which are input to the ECU 90 and the functions of these input signals will now be described in detail hereinbelow.

(1) Detection signal indicative of a position of a shift lever.

This signal affects control of the line pressure (line), primary pressure (ratio), and clutch pressure (clutch) required for each range by outputting range signals identifying lever positions P, R, N, D and L (park, reverse, neutral, drive and low, respectively).

(2) Detection signal indicative of the opening degree of a throttle of a carburetor.

This signal is used to determine engine torque from a memory storing data previously input, and to determine an object ratio or object engine speed.

(3) Detection signal indicative of an idle position of the carburetor.

This signal facilitates correction of the signal from the throttle opening degree sensor of the carburetor, and an improvement in the accuracy of the control.

(4) Accelerating pedal signal.

This signal indicates the will of a driver on the basis of the degree of depression of an accelerating pedal, and facilitates determination of a control direction when the vehicle is moving or started.

(5) Brake signal.

This signal indicates whether a braking pedal has been depressed or not, and facilitates determination of a control direction for a disconnection of the hydraulic clutch 74 or the like.

(6) Power mode option signal.

This signal is an optional signal from a driver-actuated switch to select the performance of the vehicle to be a sporty driving mode or an economical driving mode.

(7) Oil pressure signal.

This signal indicates an oil pressure of the hydraulic circuit.

An oil temperature signal is output, for example, by an oil temperature sensor 92 provided in the oil pan 32.

The ECU 90 has the function of switching driving frequencies of, for example, the first to third three-way electromagnetic valves 52, 60, 68 of the pressure control valve means 42 in accordance with a starting state of the vehicle and an oil temperature in the hydraulic circuit 36.

TABLE 2

Driving frequencies of pressure control electromagnetic valve in each control mode based on an oil temperature.

| | | −30 | −20 | −10 | 0 | +10 °C. |
|---|---|---|---|---|---|---|
| | Oil Temp. | | | | | |
| Schedule 1 | Line | 12.5 Hz | 25 Hz | 50 Hz | 100 Hz | |
| | Ratio | 12.5 Hz | 25 Hz | 50 Hz | 100 Hz | |
| | Clutch | 12.5 Hz | 25 Hz | 50 Hz | 100 Hz | |

| | | −30 | −20 | −15 | −10 | −5 | 0 | +10 °C. |
|---|---|---|---|---|---|---|---|---|
| | Oil Temp. | | | | | | | |
| Schedule 2 | Line | 25 Hz | | | | | 50 Hz | 100 Hz |
| | Ratio | 25 Hz | | | | | 50 Hz | 100 Hz |
| | Clutch | 25 Hz | | | | | 50 Hz | 100 Hz |

Namely, as shown in Table 2, the ECU 90 switches the driving frequencies of the first to third three-way electromagnetic valves 52, 60, and 68 in accord with the oil temperature on the basis of Schedule 1 until the vehicle starts moving for the first time and the hydraulic clutch 74 is completely connected and locked up after the engine has been actuated by turning on a not-illustrated ignition switch. If the actuation acceleration of the engine is not the first actuation, the ECU 90 switches the driving frequencies of the valves 52, 60, and 68 in accord with the oil temperature on the basis of Schedule 2.

In other words, at low temperatures, the viscosity of the oil is high and, at the same time, when the engine is started, initial problems occur due to air existing in each valve and each passage, or the like, so that the clutch pressure decreases and the hydraulic clutch 74 cannot be accurately operated. To prevent this in this embodiment, switching of the driving frequencies of the first to third valves 52, 60, and 68 is effected in dependence on oil temperature to achieve a proper oil pressure which does not cause a slip of the hydraulic clutch 74.

The relations based on results of experiments with various duty ratios, output pressures, and driving frequencies at the oil temperature of −25° C. will now be described with reference to a graph of FIG. 3. Namely, output pressure characteristics depending on the driving frequencies at the oil temperature of −25° are as follows. When the driving frequency is high, the opening/closing time per duty cycle is short, the oil viscosity is large, and the leading and trailing response times of the output pressure are long. When the duty ratio is small, the output pressure cannot completely rise, so that the pressure is not easily increased. On the contrary, when the duty ratio is large, the trailing timing of the output pressure is delayed, so that a sharpness in reduction of the pressure deteriorates. When the driving frequency is lowered, the opening/closing time per cycle becomes long and an influence by the delay of the response time of the pressure is reduced, so that the output pressure in the duty cycle can be controlled.

Figure 5:
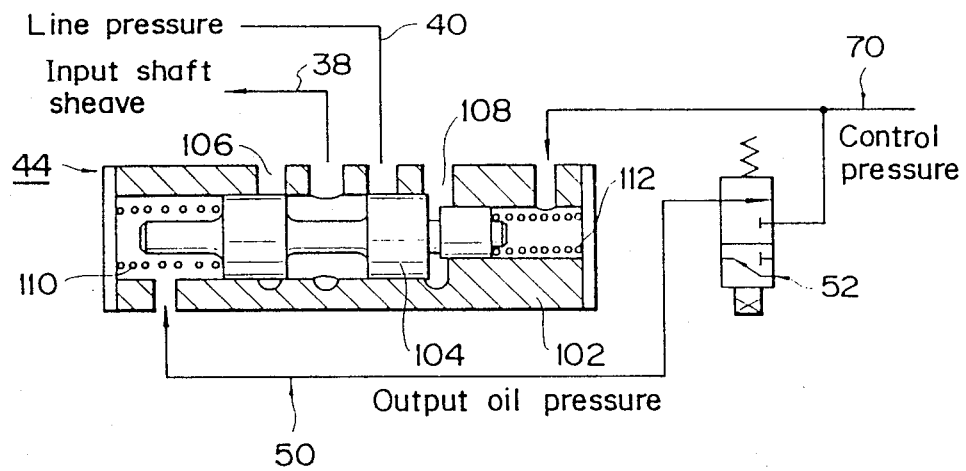

As shown in FIG. 5, the primary pressure control valve 44 has a spool 104 which reciprocates in a main body 102. There is a relation of D>d between a diameter D on the primary side of the spool valve 104 and a diameter d on the clutch side thereof. A first atmosphere opening 106, the first oil passage 38, the second oil passage 40, a second atmosphere opening 108, and the ninth oil passage 70 are coupled to the main body 102 as shown in FIG. 5. The fourth oil passage 50 extends to the lower left side of the main body 102. In addition, first and second springs 110 and 112 are provided in the main body 102 for pressing the spool 104 from the left and right so as to locate the spool 104 at predetermined positions, namely positions so that the respective passages are not in communication, as shown in FIG. 5.

Figure 6:
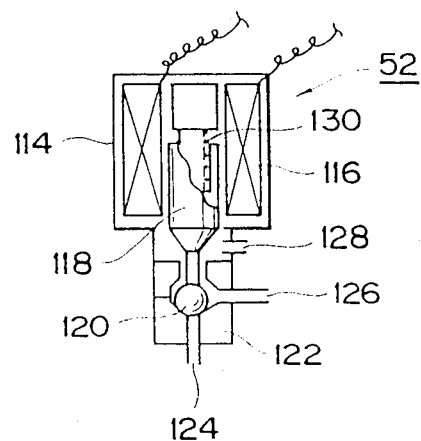

Since the first to third three-way electromagnetic valves 52, 60, and 68 have the same structure, only the schematic structure of the first valve 52 will be described in detail with reference to FIG. 6. The first valve 52 comprises: a casing 114; two electromagnetic coils 116 in the casing 114; a plunger 118 which moves between the coils 116; a spherical member 120 made of steel and attached to an end of the plunger 118; a sheet portion 122 which surrounds the spherical member 120; input/output ports 124 and 126 and an atmosphere port 128 formed in the sheet portion 122; and a spring 130 to press the plunger 118 in a direction so as to effect a connection to the atmosphere. That is, when no current is supplied to the coil 116, the plunger 118 is moved downward by the pressing force of the spring 130, and the input port 124 is closed by the spherical member 120, thereby allowing the output port 126 to communicate with the atmosphere port 128. On the contrary, when current is supplied to the coil 116, magnetic fields are generated by the coil 116, the plunger 118 is moved upward against the pressing force of the spring 130, and the atmosphere port 128 is closed by the spherical member 120, thereby allowing the input port 124 to communicate with the output port 126. The spherical member 120 is technically set to a free state upon the supply of a current to the coil 116 and is pushed by oil pressure from the input port 124 so as to close the atmosphere port 128.

The operation of the embodiment will now be described.

As shown in FIG. 4, in the continuously variable speed change gear mechanism 2, the oil pump 30 on the rotary shaft 18 operates in response to the rotation of the rotary shaft 18. The oil is drawn through the oil filter 34 from the oil pan 32 located in the bottom portion of the change gear mechanism. A line pressure which is normally the pump pressure is controlled by the line pressure control valve 54. If a leakage or escape amount of oil discharged through the line pressure control valve 54 is large, the line pressure is reduced. On the contrary, if the escape amount is small, the line pressure rises.

The operation of the valve 54 is controlled by the special second three-way electromagnetic valve 60. In accordance with the operation of the valve 60, the line pressure control valve 54 operates. The second valve 60 is controlled by varying a duty ratio of a signal which has a selected frequency for all duty ratios except 0% and 100%. A duty ratio of 0% corresponds to the state in which the second three-way electromagnetic valve 60 does not operate. In this state, the output side communicates with the atmosphere side, so that the output oil pressure is set to an effective value of zero. On the other hand, a duty ratio of 100% corresponds to a state in which the second valve 60 operates continuously, the output side communicates with the atmosphere side, and the same maximum output oil pressure as the control pressure is derived. The output oil pressure is varied by varying the duty ratio in a range between 0% and 100%. Therefore, according to the characteristics of the second valve 60, the line pressure control valve 54 can be operated in an analogous manner and the line pressure can be controlled by varying a duty ratio of the valve 60. The operation of the valve 60 is controlled by the ECU 90.

The primary pressure to control the change gear is controlled by the primary pressure control valve 44. The operation of the valve 44 is also controlled by the special first three-way electromagnetic valve 52 in a manner similar to that just discussed for the line pressure control valve 54. The first valve 52 is used to communicate the primary pressure with the line pressure or with the atmosphere side. The belt ratio is set to the full overdriving side by communicating the primary pressure with the line pressure. Alternatively, the belt ratio is set to the full low side by communicating the primary pressure with the atmosphere side.

The clutch pressure control valve 62 to control the clutch pressure communicates the clutch pressure with the line pressure side when maximum clutch pressure is needed. To the contrary, when the lowest clutch pressure is necessary, the valve 62 communicates the clutch pressure with the atmosphere side. Since the operation of the valve 62 is also controlled by the special third three-way electromagnetic valve 68 in a manner similar to that for the line pressure control valve 54 and primary pressure control valve 44, a description of this operation is omitted here. The clutch pressure changes within a range from atmosphere pressure (an effective pressure of zero) to the maximum line pressure.

The clutch pressure is controlled on the basis of the following five patterns.

(1) Neutral Mode

When the shift position is set to N or P and the clutch is completely disconnected, the clutch pressure is set to the lowest pressure (zero).

(2) Hold mode

When the shift position is set to D or R and the throttle is low because the driver does not want to move the vehicle, or when the driver desires to cut off the engine torque by decelerating during vehicle movement, the clutch pressure is set to such a low level that the clutch just comes into contact.

(3) Start mode

When the clutch is again coupled at the start of the engine or after the clutch was disconnected, the clutch pressure is set to a proper level in accord with the engine generation torque (clutch input torque), such that an overdrive of the engine is prevented and the vehicle can be smoothly operated.

(4) Special start mode (a) A state in which the vehicle velocity is 8 km/hour or more and the shift lever was repetitively used such as D N D, or (b) a state in which the braking state was released during deceleration with the vehicle velocity in the range of 8 km/hour < vehicle velocity < 15 km/hour.

(5) Driving mode

When the vehicle has entered the complete running state and the clutch is perfectly coupled, the clutch pressure is then set to a level high enough to endure the engine torque.

The pattern (1) is realized by a special switching valve (not shown) interlocked with the shifting operation. The other patterns (2) to (5) are attained by controlling the duty ratios of the first to third three-way electromagnetic valves 52, 60, and 68 using signals from the ECU 90. Particularly, in the state of (5), the seventh oil passage 64 is coupled to the tenth oil passage 72 by the clutch pressure control valve 62, thereby forming the maximum pressure generating state. At this time, the clutch pressure is effectively equal to the line pressure.

The primary pressure control valve 44, line pressure control valve 54, and clutch pressure control valve 62 are controlled by the output oil pressures from the first to third three-way electromagnetic valves 52, 60, and 68, respectively. The oil pressures to control the first to third valves 52, 60, and 68 are the constant oil pressure provided by the constant pressure control valve 48. Although these control oil pressures are always lower than the line pressure, they are stable constant pressures. On the other hand, the control oil pressure is also supplied to the control valves 44, 54, and 62, thereby stabilizing them.

An electronic control of the continuously variable speed change gear mechanism 2 will now be described.

The change gear mechanism 2 is controlled by oil pressures, namely a proper line pressure to hold the belt and transmit the torque, a primary pressure to change a change gear ratio, and a clutch pressure to dependably couple the hydraulic clutch 74 are each produced by commands from the ECU 90.

Figure 1:
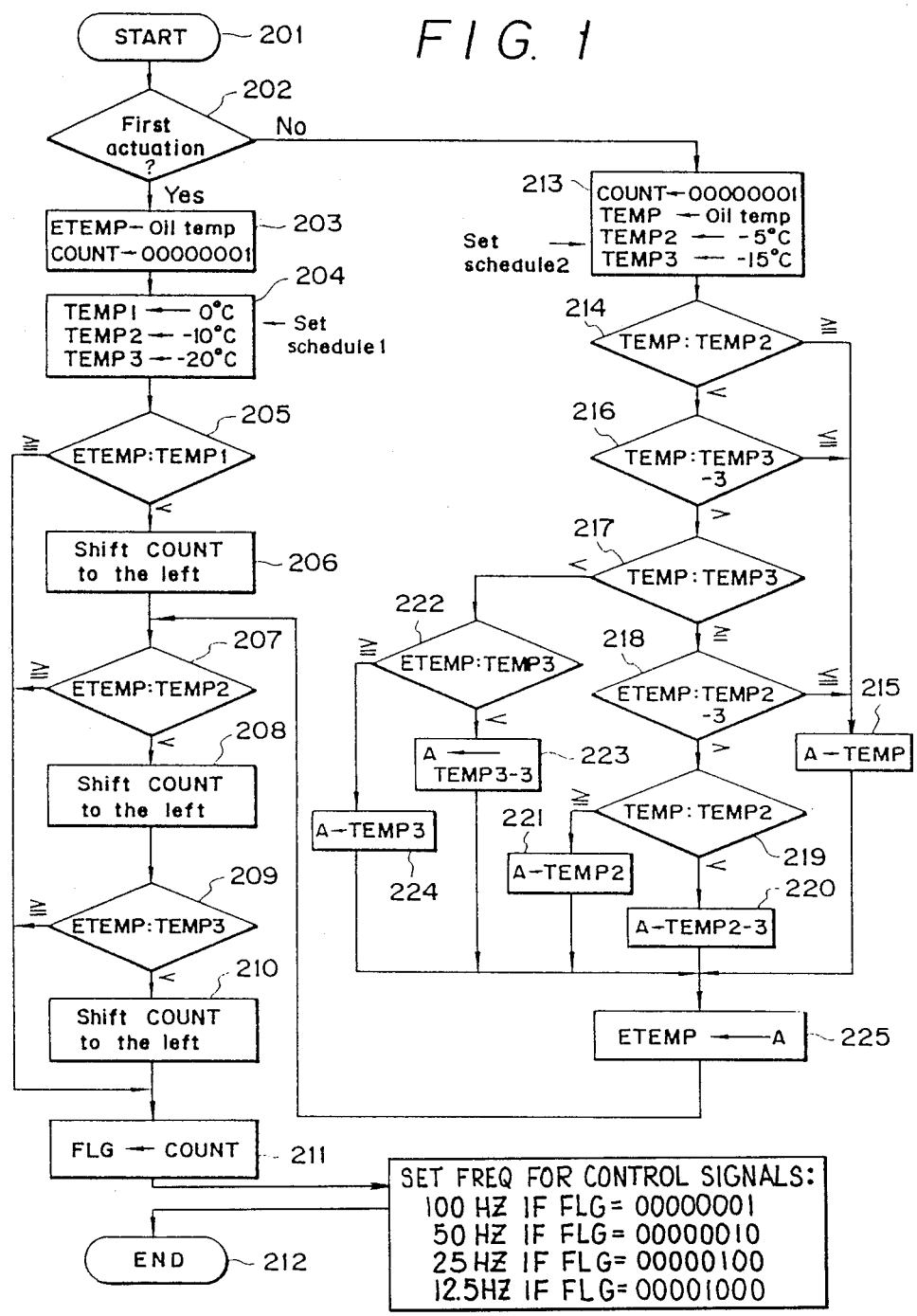

A hydraulic control method in the embodiment will now be described with reference to a flowchart of FIG. 1.

When an ignition switch is turned on and a program is started (step 201), a check is made to see if the engine vehicle has been actuated (moved) for the first time or not, for example whether the engine is considerably low temperature (step 202).

If YES in step 202, an oil temperature is detected in step 203, the value of the oil temperature is stored in ETEMP, and a count value of a register FLG shown in FIG. 2 is set to "00000001".

In the next step 204, the ignition switch has already been turned on, the vehicle was started after the actuation of the engine, and the lock-up state in which the hydraulic clutch 74 is perfectly connected is obtained. Therefore, in this step, as shown in Table 2 mentioned before, the driving frequencies of the first to third electromagnetic valves 52, 60, and 68 are controlled in accord with Schedule 1. In step 204, an oil temperature value of 0° C. is stored in $TEMP_1$, an oil temperature value of −10° C. is stored in $TEMP_2$, and an oil temperature value of −20° C. is stored in $TEMP_3$.

Next, in step 205, ETEMP is compared with $TEMP_1$. In step 205, if ETEMP ≧ $TEMP_1$ (meaning the oil temperature is a value of 0° C. or higher), the oil viscosity is relatively small. Therefore, the processing routine advances to step 211 and the count value is stored in the FLG register unchanged (i.e. it is "00000001"). Then, the END step 212 follows. The first to third electromagnetic valves 52, 60, and 68 are driven at a frequency of 100 Hz.

In step 205, if ETEMP < $TEMP_1$ (meaning the oil temperature is lower than 0° C.), the oil viscosity is slightly larger, and the count value for the FLG register is shifted to the left by one (i.e. it is set to "00000010") in step 206.

In step 207, ETEMP is compared with $TEMP_2$. In step 207, if ETEMP ≧ $TEMP_2$ (meaning the oil temperature lies within a range from 0° to −10° C.), the processing routine advances to step 211 and the count value is stored in the FLG register (i.e. it is "00000010"). Then, the END step 212 follows. The electromagnetic valves 52, 60, and 68 are driven at the frequency of 50 Hz, thereby slightly raising the oil pressure and obtaining a predetermined oil pressure.

In step 207, if ETEMP < $TEMP_2$ (meaning the oil temperature is lower than −10° C.), the oil viscosity is still higher, so the count value for the FLG register is shifted to the left by one (i.e. it is set to "00000100") in step 208.

In step 209, ETEMP is compared with $TEMP_3$. In step 209, if ETEMP ≧ $TEMP_3$ (meaning the oil temperature falls within a range from −10° to −20° C.), the count value is stored in the FLG register unchanged (i.e. it is "00000100") in step 211. Then, the END step 212 follows. The electromagnetic valves 52, 60, and 68 are driven at the frequency of 25 Hz, thereby further raising the oil pressure and obtaining a predetermined oil pressure.

In step 209, if ETEMP < $TEMP_3$ (meaning the oil temperature is lower than −20° C.), the oil viscosity is larger than that in the foregoing case. Accordingly, step 210 follows and the count value for the FLG register is again shifted to the left by one (i.e. it is set to "000010000"), and it is then stored in FLG in step 211, and the END step 212 follows. The electromagnetic valves 52, 60, and 68 are driven at the frequency of 12.5

Hz, thereby raising the oil pressure and obtaining a predetermined oil pressure.

On the other hand, in the case where the actuation of the vehicle is not the first actuation and the answer in step 202 is NO, step 213 follows. In this step, as shown in Table 2 mentioned before, the driving frequencies of the electromagnetic valves 52, 60, and 68 are switched in accord with the set Schedule 2. In step 213, the detected oil temperature is stored in TEMP, and oil temperature value of $-5°$ C. is stored in $TEMP_2$, an oil temperature value of $-15°$ C. is stored in $TEMP_3$, and the count value of the FLG register shown in FIG. 2 is set to "00000001".

In step 214, TEMP is compared with $TEMP_2$. In step 214, if TEMP$\geq TEMP_2$ (meaning the oil temperature is $-5°$ C. or higher), step 215 follows and the value in TEMP is stored in a location A. In step 225, the value in location A is stored in ETEMP. Thereafter, the processing routine advances to step 207 and the processes are executed in the manner already described above. As mentioned above, when the oil temperature is $-5°$ C. or higher, the count value of the FLG register is left unchanged (i.e. it is "00000001"), and the electromagnetic valves are driven at the frequency of 100 Hz.

In step 214, if TEMP$<TEMP_2$ (meaning the oil temperature is lower than $-5°$ C.), step 216 follows.

In step 216, TEMP is compared with the temperature value obtained by adding a hysteresis value, for example $-3°$ C., to $TEMP_3$. In step 216, if TEMP$\leq$ the temperature value obtained by adding $-3°$ C. as a hysteresis to $TEMP_3$, step 215 follows. In step 215, the value in TEMP is stored in the location A. The value in location A is stored in ETEMP in step 225, the processing routine advances to step 207, and the processes are executed in the manner already described above. In this manner, since the oil temperature is low, the count value of the FLG register is shifted at steps 208 and 210 to "00000100". The electromagnetic valves 52, 60, and 68 are driven at the frequency of 25 Hz, thereby obtaining a predetermined oil pressure.

In step 216, if TEMP$>$ the temperature value obtained by adding $-3°$ C. as a hysteresis to $TEMP_3$, step 217 follows. In step 217, TEMP is compared with $TEMP_3$. In step 217, if TEMP$\geq TEMP_3$, step 218 follows. In step 218, ETEMP is compared with the temperature value derived by adding $-3°$ C. as a hysteresis to $TEMP_2$. In step 218, if ETEMP$\leq$ the temperature value derived by adding $-3°$ C. as a hysteresis to $TEMP_2$, the value in TEMP is stored in location A in step 215. The value in location A is stored in ETEMP in step 225, the processing routine advances to step 207, the processes are executed in the manner described above In this case, the first to third valves 52, 60, and 68 are driven at the frequency of 50 Hz.

In step 218, if ETEMP$>$ the temperature value obtained by adding $-3°$ C. as a hysteresis to $TEMP_2$, step 219 follows and TEMP is compared with $TEMP_2$. In step 219, if TEMP$<TEMP_2$ (meaning the oil temperature is less than $-5°$ C.), step 220 follows. In step 220, the temperature value obtained by adding $-3°$ C. as a hysteresis to $TEMP_2$ is stored in location A. The value in location A is stored in ETEMP in step 225. The processing routine advances to step 207 and the processes are then executed in the manner already described above.

In step 219, if TEMP$\geq TEMP_2$ (meaning the oil temperature is $-5°$ C. or higher), the value in $TEMP_2$ is stored in location A in step 221. The value in location A is stored in ETEMP in step 225. The processing routine then advances to step 207, and the processes are executed in the manner described above.

On the other hand, in step 217, if TEMP$<TEMP_3$ (meaning ETEMP is lower than $-15°$ C.), step 222 follows and ETEMP is compared with $TEMP_3$. In step 222, if ETEMP$<TEMP_3$, the temperature value obtained by adding $-3°$ C. as a hysteresis to $TEMP_3$ is stored in location A in step 223. The value in location A is stored in ETEMP in step 225. The processing routine then advances to step 207, and the processes are executed in the manner described above.

In step 222, if ETEMP$\geq TEMP_3$, the value in $TEMP_3$ is stored in location A in step 224. The value in location A is stored in ETEMP in step 225. The processing routine then advances to step 207, and the processes are executed in the manner already described above.

Thus, the driving frequencies of the first to third valves 52, 60, and 68 are switched in accord with the oil temperature, and a predetermined oil pressure can be derived. Therefore, even when the oil viscosity is large or even at low temperatures when air exists in each valve or each passage, it is possible to prevent such an inconvenience that the clutch pressure decreases and the hydraulic clutch 74 does not accurately operate. The hydraulic clutch 74 can be reliably connected. A good starting state is obtained. The operability can be improved.

The ECU 90, includes a microcomputer which fundamentally calculates the duty ratio at 100 Hz. Therefore, for instance, in the case of operating at the frequency of 25 Hz at low temperatures where the count value of the FLG register is set to "00000100", it is sufficient that a value obtained by multiplying the calculated duty ratio for 100 Hz by $2^2$ is output as the duty output value on the basis of the content of the FLG register. The program for the microcomputer is simplified. The duty output value can be easily changed. The program to switch the driving frequencies of the first to third three-way electromagnetic valves 52, 60, and 68 can be easily changed.

Further, when driving at the frequency of 100 Hz in the driving mode, the line pressure and primary pressure are controlled. Then, there is no need to drive the electromagnetic valves at the frequency of 100 Hz as its response speed. It is sufficient to drive them at a frequency of about 50 Hz. Consequently, operational deterioration of each of the electromagnetic valves 52, 60, and 68 can be prevented and the durability thereof can be improved.

Moreover, after the first actuation of the engine, since $-3°$ C. is provided as a hysteresis when switching between the driving frequencies of the electromagnetic valves 52, 60, and 68, it is possible to prevent pointless frequency fluctuations.

In this embodiment, the driving frequency of each of the electromagnetic valves 52, 60, and 68 can be always switched. However, in a case where the clutch slides in the normal start mode or special start mode and torque is propagated, in order to prevent the occurrence of vibration or shock, the operating mode can be limited to the neutral mode, the hold mode, or a driving mode other than the start mode.

The present invention is not limited to details of the foregoing first embodiment, but many variations and modifications are possible within the spirit of the scope of the invention.

For example, in this first embodiment, the oil temperature has been detected by a temperature sensor provided for the oil pan. However, the oil temperature sensor can be provided at another arbitrary position in the hydraulic circuit. The oil temperature at any position in the hydraulic circuit can be also detected.

As will be obvious from the foregoing detailed description of the first embodiment, switching of the driving frequency of the pressure control valve arrangement for controlling the oil pressure in accordance with an oil temperature means that, even at low temperatures at which the oil viscosity is large, the necessary oil pressure can be assured, the clutch pressure or the like can be properly maintained, and the operability can be improved.

Moreover, since the electronic control unit (ECU) lowers the driving frequency from the fundamental frequency by $\frac{1}{2}n$ when the oil temperature is lower than a predetermined value, the program can be easily changed and the duty output value can be easily changed on the basis of the bit content of the frequency setting register.

A second embodiment of the present invention will now be explained.

Figure 7:
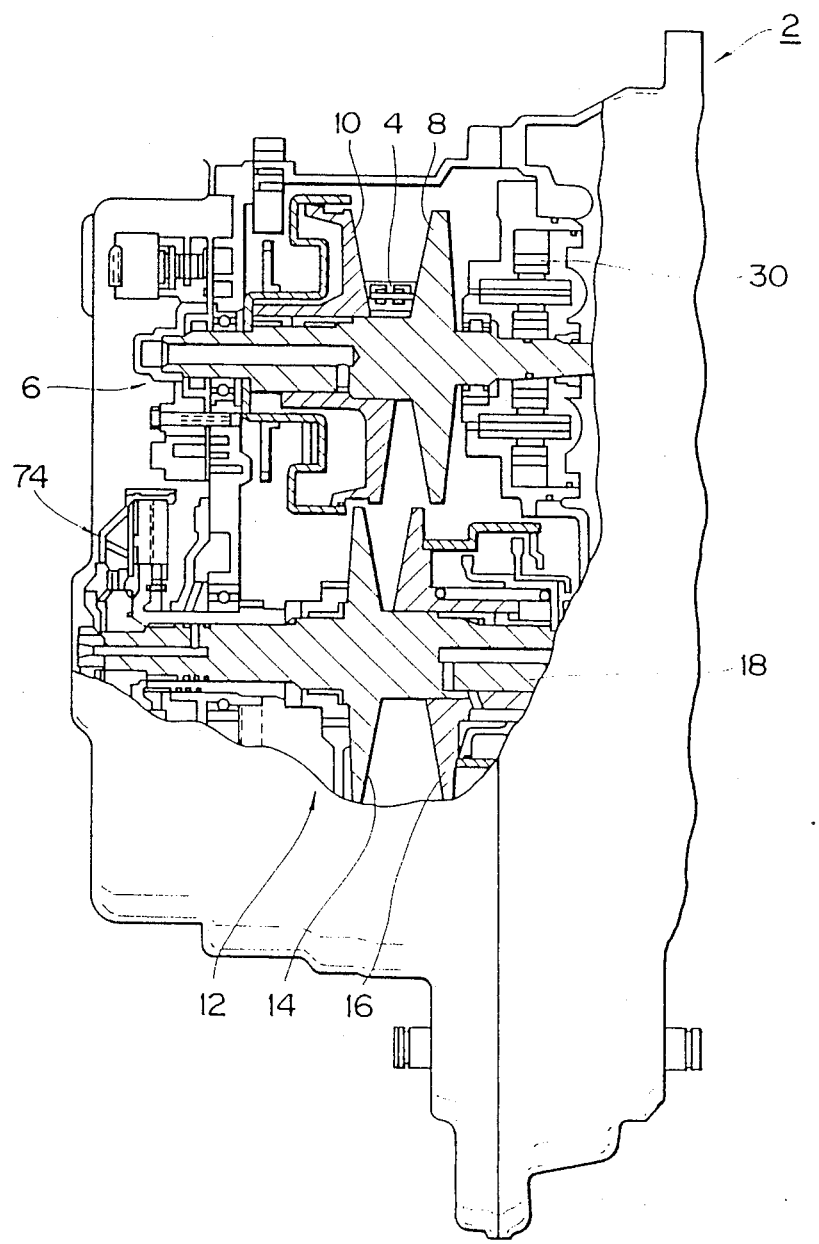
Figure 8:
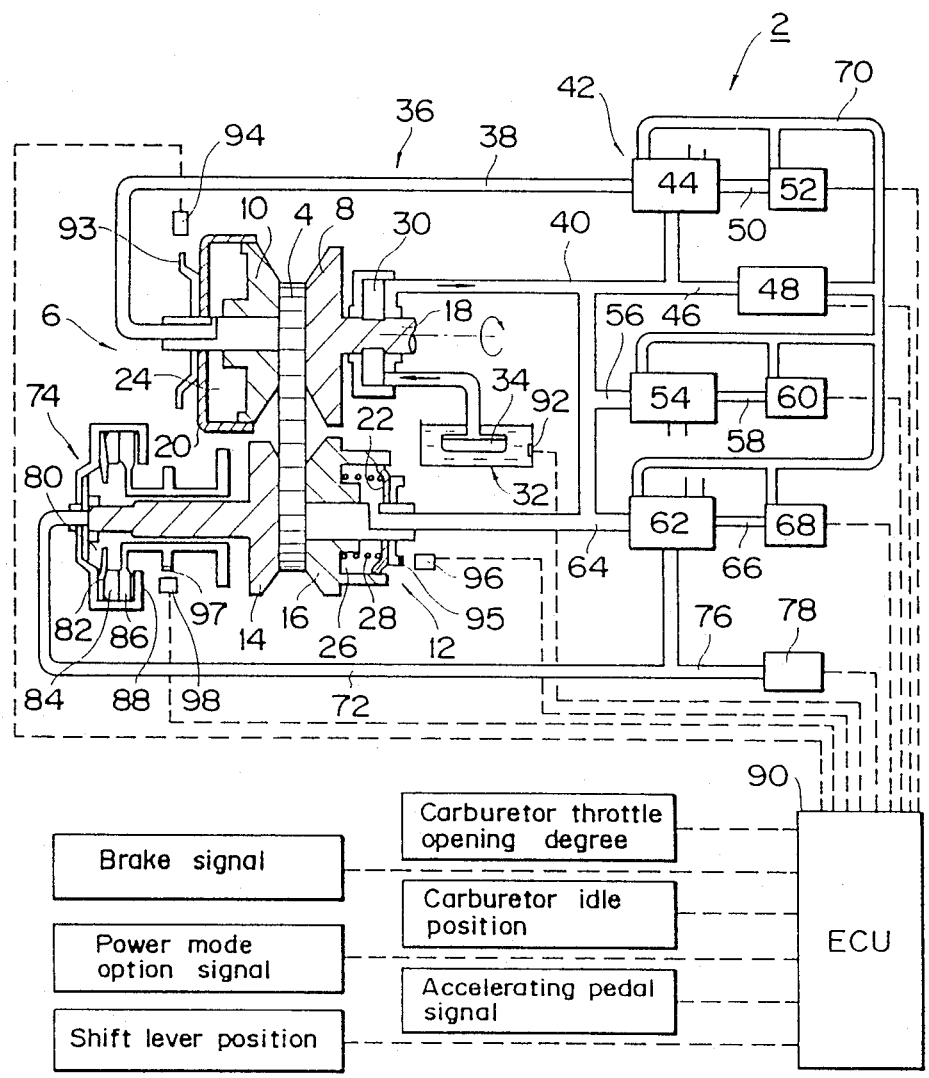
Figure 9:
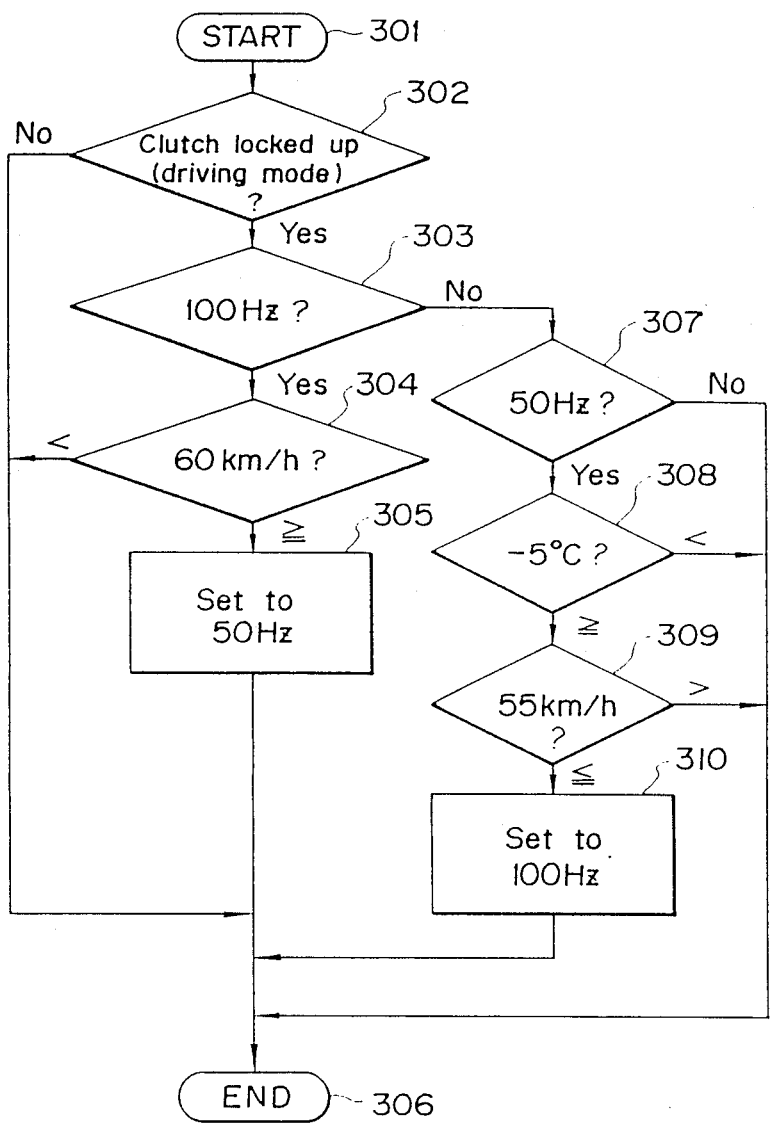

FIGS. 7 to 9 show the second embodiment of the invention, in which parts and components which are the same as or similar to those in the first embodiment are designated by the same reference numerals, and detailed descriptions thereof are omitted.

Since the second embodiment is constructed substantially similar to the first embodiment, only the characteristic arrangement and operation which is different from the first embodiment will be described hereinbelow.

In the second embodiment, the following parts and components are further added to the arrangement of the first embodiment.

Referring now to FIG. 8, an input shaft rotation detecting gear 93 is attached to the outside of the first housing 20. A first rotation sensor 94 on the input shaft side is provided near an outer peripheral portion of the gear 93. An output shaft rotation detecting gear 95 is attached to the outside of the second housing 22. A second rotation sensor 96 on the output shaft side is provided near an outer peripheral portion of the gear 95. Detection signals from the first and second rotation sensors 94 and 96 are input to the ECU 90, permitting it to detect the engine speed and the belt ratio.

An output transferring gear 97 is attached to the hydraulic clutch 74. A third rotation sensor 98 to detect the rotation of the final output shaft is provided near an outer peripheral portion of the gear 97. Namely, the third rotation sensor 98 detects the rotation of the final output shaft which is directly coupled with a reduction gear, a differential apparatus, a drive shaft, and a tire, and thus facilitates detection of the vehicle velocity. On the other hand, the rotational speeds before and after the hydraulic clutch 74 as respectively detected by the second and third rotation sensors 96 and 98 can also be used to determine the clutch slip amount.

Further, the ECU 90 also can switch the driving frequencies of the first to third electromagnetic valves 52, 60, and 68 of the pressure control valve means 42 in accordance with vehicle detection signals obtained by vehicle velocity detecting means, for example by the first to third rotation sensors 94, 96, and 98. That is, when the vehicle velocity rises to a value of, for example, 60 km/hour or more, the ECU 90 switches the driving frequencies of the electromagnetic valves 52, 60, and 68 from the fundamental frequency of 100 Hz to 50 Hz. When the vehicle velocity is reduced to 55 km/hour or less, the ECU 90 switches the driving frequencies to the fundamental frequency of 100 Hz.

The switching control of driving frequencies according to the oil temperature and the electronic and hydraulic control of the continuously variable speed change gear mechanism 2 in accord with the oil temperature in the second embodiment are similar to that already described for the first embodiment in conjunction with FIGS. 1 to 6, and will thus be easily understood by reference to the diagrams and flowchart of FIGS. 7 to 9. Therefore, a detailed description thereof is omitted here.

A hydraulic control method dependent on the vehicle velocity in the present embodiment will now be described with reference to the flowchart of FIG. 9.

When the program is started (step 301), a check is made in step 302 to see if the clutch has been locked up, that is, whether the operating mode has been shifted to the driving mode or not.

If NO in step 302, the program is finished in step 306. If YES in step 302, a check is made at step 303 to see if the driving frequencies of the electromagnetic valves 52, 60, and 68 are the fundamental frequency of 100 Hz or not. If YES in step 303, a check is made to see if the vehicle velocity has increased to 60 km/hour or more (step 304).

In step 304, if it is determined that the vehicle velocity is less than 60 km/hour, the program is finished (step 306). If the vehicle velocity is 60 km/hour or more, the driving frequency is switched from the fundamental frequency of 100 Hz to 50 Hz (step 305). Then, the program is finished (step 306).

If the answer in step 303 is NO, a check is made to see if the driving frequency is 50 Hz or not (step 307). If NO in step 307, the program is finished (step 306). If YES in step 307, a check is made to see if the oil temperature is $-5°$ C. or higher (step 308). In step 308, if the oil temperature is lower than $-5°$ C., the program is finished (step 306). If the oil temperature is $-5°$ C. or higher, a check is made to see if the vehicle velocity is 55 km/hour or less (step 309).

In step 309, if the vehicle velocity exceeds 55 km/hour, the driving frequency is switched from 50 Hz to the fundamental frequency of 100 Hz (step 310), and then the program is finished (step 306).

Thus, the driving frequency of each of the electromagnetic valves 52, 60, and 68 can be switched in accordance with the vehicle velocity. The durability of each of the valves 52, 60, and 68 as the pressure control valve arrangement during high speed operation can be improved. This embodiment is economically advantageous. Actually, the durability is doubled by switching the driving frequency from 100 Hz to 50 Hz.

On the other hand, in the low speed running mode when the vehicle velocity is 55 km/hour or less, by setting the driving frequencies of the first to third three-way electromagnetic valves 52, 60, and 68 to the fundamental frequency of 100 Hz, the pressure fluctuation of the hydraulic circuit can be reduced, and the inconvenience of an unpleasant feeling given to the driver and passengers due to a vibration of the vehicle body can be definitely prevented.

Further, in the high speed running mode when the vehicle velocity is 60 km/hour or more, by switching the driving frequencies of the electromagnetic valves 52, 60, and 68 from the fundamental frequency of 100 Hz to 50 Hz, even if a pressure fluctuation of the hydraulic circuit occurs, the vibration which is caused in the handle, sheet or the like increases due to the velocity, so that there is no inconvenience.

The present invention is not limited to details of this second embodiment, but many variations and modifications are possible within the scope of the claims.

For instance, in this embodiment of the invention, the driving frequency of each of the electromagnetic valves 52, 60, and 68 can be always switched. However, in the case where the clutch slides and the torque is propagated in the normal start mode or special start mode, in order to prevent the occurrence of a vibration or shock, the operating mode can be limited to the neutral mode, the hold mode, or a driving made other than the start mode.

In addition, in this embodiment, the first to third rotation sensors have been used as the vehicle velocity detecting means. However, various kinds of devices capable of detecting the vehicle velocity can also be used. A vehicle velocity sensor can also be newly attached to a desired portion.

As will be obvious from the above detailed description of the second embodiment, by switching the driving frequency of the pressure control valve means for controlling oil pressure in accord with vehicle velocity, the durability of the pressure control valve means in the high speed running mode can be improved and this embodiment is economically advantageous.

To the contrary, in the low speed running mode, a pressure fluctuation in the hydraulic circuit can be reduced by the driving frequency of the pressure control valve means and an inconvenience such as an unpleasant feeling given to a driver and passengers due to vibration of the vehicle body can be certainly prevented.

Further, even when the driving frequency of the pressure control valve means is set to the fundamental frequency in the high speed running mode, a pressure fluctuation in the hydraulic circuit occurs and a large vibration also occurs in a handle, a sheet or the like due to the velocity. Therefore, there is no inconvenience.

The third embodiment of the invention will now be practically described hereinbelow.

Since constructions of a continuous variable speed change gear and a hydraulic circuit in the third embodiment are similar to those in the second embodiment, their descriptions are omitted here.

The characteristic portions of a line pressure control method in the third embodiment will be described hereinbelow.

Since various kinds of signals which are input to the electronic control unit (ECU) 90 and the functions of these input signals have already been described in the first embodiment, their descriptions are omitted here.

When the operating mode of the hydraulic clutch 74 is shifted from the holding mode to the starting mode, the ECU 90 detects an oil temperature by, e.g., an oil temperature sensor (not shown). When the detected oil temperature is a predetermined temperature or lower, the ECU 90 increases a duty for a line pressure to thereby raise the line pressure.

Figure 10:
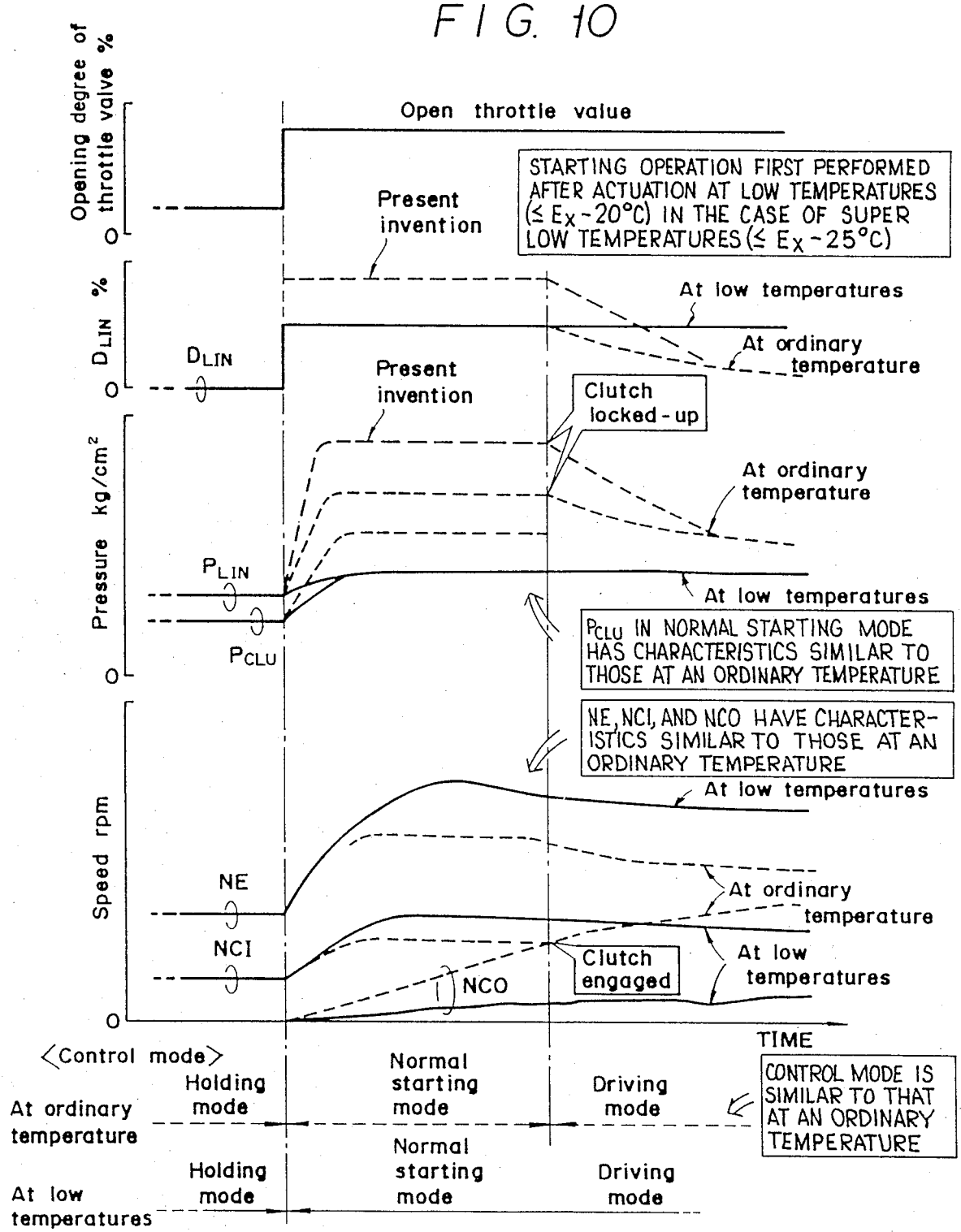
FIGS. 10 to 14 show the third embodiment of the invention.

In more detail, the predetermined temperature is set to −20° C. When shifting from the holding mode to the starting mode, if the oil temperature detected by the oil temperature sensor is −20° C. or lower, as shown in FIG. 10, the line pressure solenoid drive duty ($D_{LIN}$) is increased to 90%, thereby raising the line pressure.

In order to obtain enough object line pressure, the line pressure solenoid drive duty ($D_{LIN}$) needs to be set to a value which satisfies the relation of $D_{LIN} > D_T$ ($D_T$ is a drive duty at which the characteristics at an ordinary temperature are obtained). However, the value of $D_T$ is not always constant. For instance, the value of $D_{LIN}$ is set to 90% in consideration of a high safety ratio.

Symbols used in a time chart for a line pressure control of FIG. 10 will now be described in detail.

$D_{LIN}$: line pressure solenoid drive duty,
NE: engine speed,
NCI: clutch input speed (vehicle velocity),
NCO: clutch output speed,
$P_{LIN}$: line pressure,
$P_{CLU}$: clutch pressure.

The characteristics depending on the oil temperature will now be described.

Figure 12:
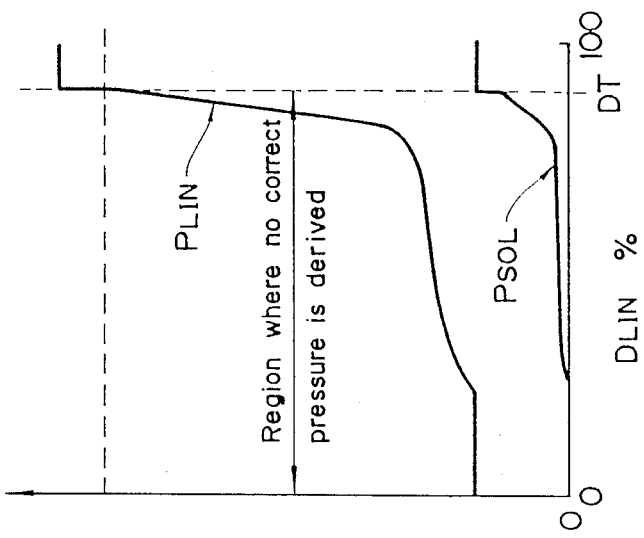
Figure 13:
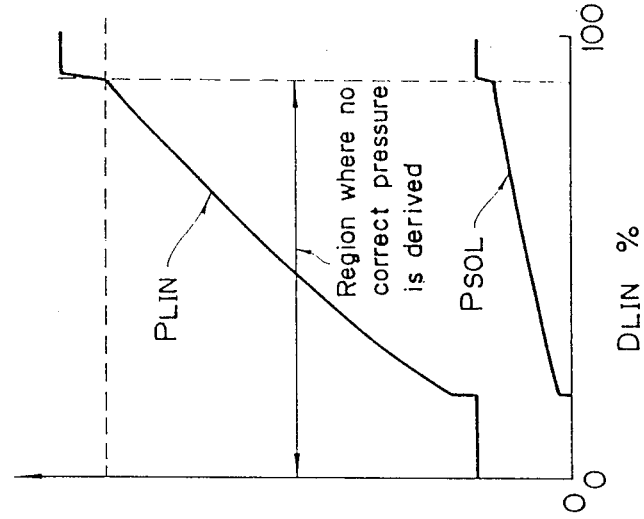

In the case of the duty solenoid of the invention, when the drive duty is increased, an opening area of an oil passage is enlarged, a flow rate increases, and a solenoid pressure ($P_{SOL}$) rises Since the line pressure ($P_{LIN}$) corresponds to the pressure which is derived by amplifying the solenoid pressure ($P_{SOL}$) by the hydraulic circuit, it has characteristics as shown in FIG. 12 at an ordinary temperature. At low temperatures, e.g., at super low temperatures of −25° C. or lower, since the oil viscosity rises, even in the case of the same opening area, the flow rate is smaller than that in the case at an ordinary temperature. Therefore, the solenoid pressure ($P_{SOL}$) changes slowly to an increase in drive duty and increases just after a value in excess of the drive duty. At super low temperatures, characteristics as shown in FIG. 13 are obtained.

On the other hand, the input shaft rotation detecting gear 93 is attached to the outside of the first housing 20. The first rotation sensor 94 on the input shaft side is attached near the outer peripheral portion of the gear 93. In addition, the output shaft rotation detecting gear 95 is attached to the outside of the second housing 22. The second rotation sensor 96 on the output shaft side is attached near the outer peripheral portion of the gear 95. Detection signals of the first and second rotation sensors 94 and 96 are input to the ECU 90 and used to obtain the belt ratio of the engine rotational speed.

The output transferring gear 97 is attached to the hydraulic clutch 74. The third rotation sensor 98 to detect the rotation of the final output shaft is attached near the outer peripheral portion of the gear 97. Namely, the third rotation sensor 98 detects the rotation of the final output shaft which is directly coupled with the reduction gear, differential gear, drive shaft, and tire, thereby enabling the vehicle velocity to be detected. On the other hand, the rotations before and after the hydraulic clutch 74 can be detected by the second and third rotation sensors 96 and 98, thereby enabling a clutch slip amount to be detected.

Since the operation of this embodiment is similar to the first embodiment which has already been described, it will be easily understood.

There are five patterns for the control of the clutch pressure as already explained above. That is, there are (1) neutral mode, (2) holding mode, (3) starting mode, (4) special starting mode, and (5) driving mode. Since these modes have already been explained, their detailed descriptions are omitted here.

Figure 14:
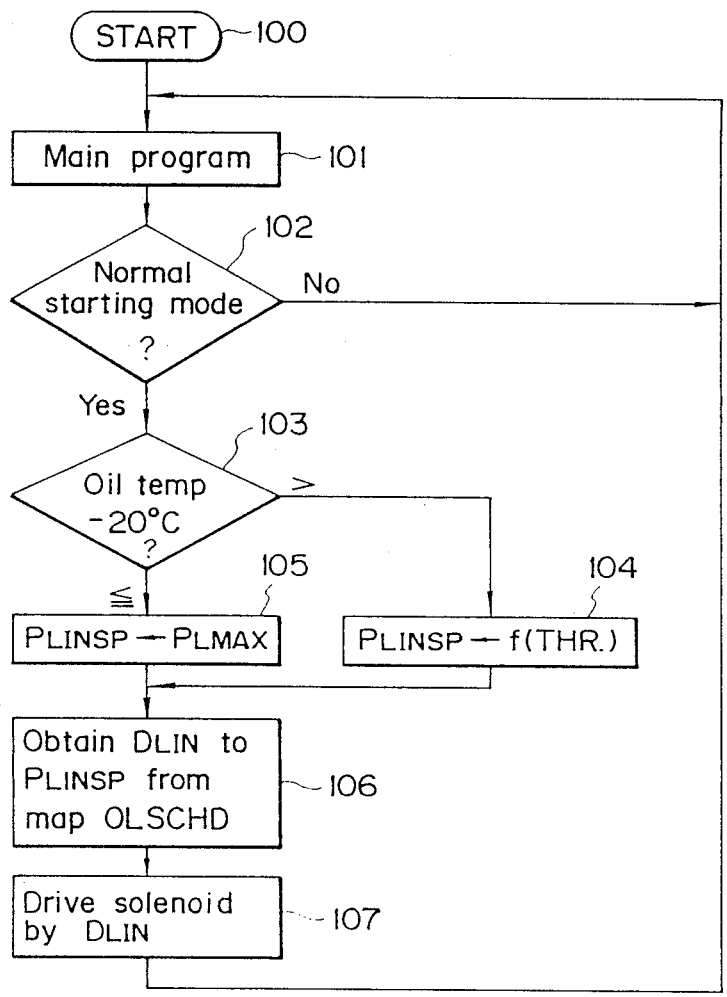

The line pressure control will now be described with reference to a flowchart of FIG. 14.

When the program is started (step 100), the processing routine first advances to the main program (step 101). Next, a check is made to see if the operating mode is the normal starting mode or not (step 102).

If NO in step 102, the processing routine is returned to the main program (step 101) and if YES, a check is made to see if the oil temperature detected by the oil temperature sensor 94 is $-20°$ C. or less or not (step 103).

Figure 11:
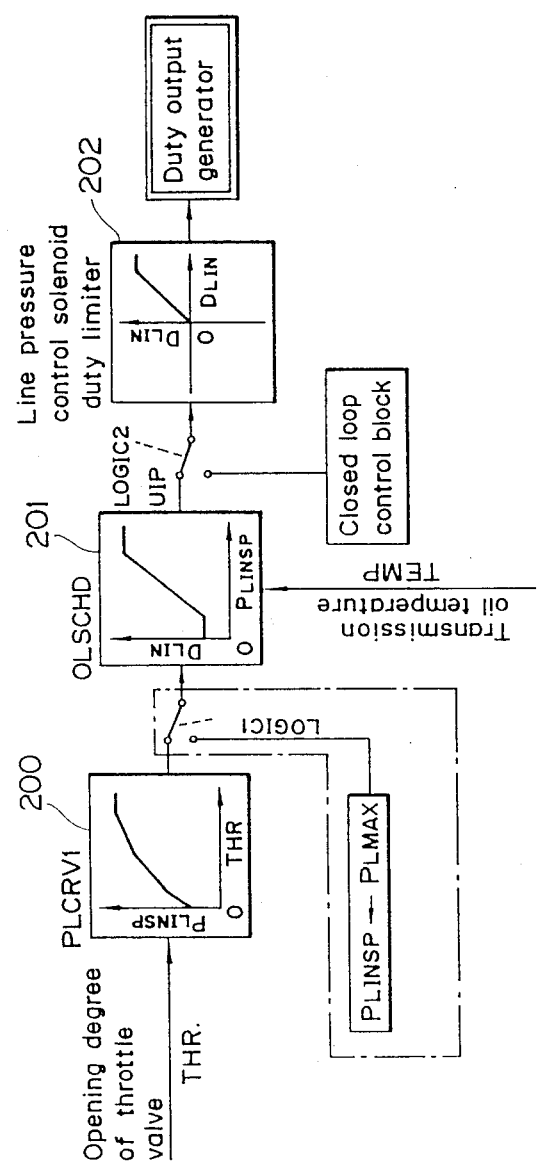

If the oil temperature exceeds $-20°$ C. in step 103, the object line pressure ($P_{LINSP}$) is determined by the function f(THR.) using an opening degree of a throttle valve as a variable (step 104). (Refer to step 200 in FIG. 11).

Further, if the oil temperature is $-20°$ C. or lower in step 103, the maximum value ($P_{Lmax}$) is replaced to the object line pressure ($P_{LINSP}$) (step 105). (Refer to step 201 in FIG. 16).

Then, the line pressure solenoid drive duty ($D_{LIN}$) is obtained from the map (OLSCHD) by both of the object line pressure ($P_{LINSP}$) which is determined by the opening degree of the throttle valve and the object line pressure ($P_{LINSP}$) to which the maximum value ($P_{Lmax}$) was replaced (step 106). (Refer to step 202 in FIG. 11). The solenoid is driven by the line pressure solenoid drive duty ($D_{LIN}$) (step 107), thereby raising the line pressure to a predetermined pressure. (Refer to step 203 in FIG. 11).

At this time, the line pressure solenoid drive duty ($D_{LIN}$) by the object line pressure ($P_{LINSP}$) to which the maximum value ($P_{Lmax}$) was replaced is set to a value of about 90%.

Thus, the oil temperature is detected by the oil temperature sensor when the operating mode of the hydraulic clutch 74 is shifted from the holding mode to the starting mode, and if the detected oil temperature is a predetermined value of $-20°$ C. or lower, the line pressure solenoid drive duty ($D_{LIN}$) is increased to 90%, thereby enabling the line pressure at low temperatures to be raised and enabling the clutch control to be executed. Consequently, the drive feeling at low temperatures can be made good.

In addition, when shifting from the holding mode to the starting mode, the line pressure at low temperatures can be raised. Thus, the chain slip due to the insufficient line pressure in the driving mode can be certainly prevented and the safety can be improved.

Further, this embodiment can be realized by merely changing the software without needing to add a new hardware. Almost of the conventional programs can be used. Accordingly, an increase amount of the memory in the ECU can be reduced. The structure does not become complicated. The cost can be reduced. The invention is economically advantageous.

As will be obvious from the above detailed description, according to the third embodiment, in a line pressure control method of a continuous variable speed change gear, an oil temperature is detected when shifting from the holding mode to the starting mode, and when the detected oil temperature is a predetermined temperature or lower, the duty for a line pressure is increased to thereby raise the line pressure. Therefore, the line pressure at low temperatures can be raised and the clutch control can be performed. A drive feeling at low temperatures can be made good. On the other hand, since the line pressure at low temperatures can be raised when shifting from the holding mode to the starting mode, the chain slip due to the insufficient line pressure in the driving mode can be certainly prevented and the safety can be improved. Further, the invention can be realized by merely changing the software without needing to add a new hardware. Almost of the conventional programs can be used. The structure does not become complicated. The cost can be reduced and the invention is economically advantageous.

Although the present invention has been described and shown with respect to the preferred embodiments, the invention is not limited to the foregoing embodiments but many modifications and variations are possible within the spirit and scope of the appended claims of the invention.

The embodiments of the invention in which an exclusive property or privilege is claimed are defined as follows:

1. A hydraulic control method for a continuously variable speed change gear mechanism including a pulley having a fixed pulley member fixed to a rotary shaft and a movable pulley member movable toward and away from the fixed pulley member in response to an oil pressure so that a groove width between said fixed and movable pulley members is respectively decreased and increased to thereby respectively increase and reduce the effective rotational radius of a belt extending between said fixed and movable pulley members to thus change a gear ratio and thereby control a gear change, pressure control valve means for controlling said oil pressure, and control unit means for controlling the operation of said pressure control valve means, said method including the step of causing said control unit means to switch a driving frequency of the pressure control valve means in accord with an oil temperature, said step of causing said control unit means to switch said driving frequency including the step of selectively operating said control unit in first and second modes in which it switches said driving frequency according to respective first and second schedules which are different and which each define said driving frequency as a function of said oil temperature.

2. A method according to claim 1, wherein said step of causing said control unit means to switch said driving frequency of said pressure control valve means includes the step in each of said first and second modes of lowering said driving frequency by a factor of $\frac{1}{2}^n$ from a fundamental frequency in response to a reduction in the oil temperature, where n is increased as oil temperature decreases.

3. A method according to claim 1, wherein said pressure control valve means includes a three-way electromagnetic valve.

4. A method according to claim 2, wherein said fundamental frequency is 100 Hz.

5. A method according to claim 1, wherein said step of causing said control unit means to switch said driving frequency of said pressure control valve means includes, in each of said first and second modes and when said oil temperature is above a predetermined temperature, the step of setting said driving frequency to a frequency less than the frequency specified by one of said first and second schedules when a vehicle velocity detection signal from a vehicle velocity detector specifies a vehicle velocity above a predetermined velocity.

6. A method according to claim 5, wherein said predetermined velocity is 60 km/hour, wherein said frequency less than the frequency specified by one of said first and second schedules is approximately half such specified frequency, and wherein said step of selectively operating said control unit includes the step of using said first schedule the first time a vehicle having said change gear mechanism therein starts moving and the step of using said second schedule the second time the vehicle starts moving.

7. A method of controlling a gear change mechanism responsive to the fluid pressure in a fluid line using electrically actuable valve means for selectively supplying a pressurized fluid to said fluid line, comprising the steps of supplying to said valve means an electrical signal at a selected frequency to control actuation of said valve means, varying a duty ratio of said electrical signal to adjust the fluid pressure within said fluid line, measuring the temperature of the fluid, and adjusting said selected frequency as a function of the measured temperature of the fluid, wherein said step of adjusting said selected frequency includes the step of setting said selected frequency to a frequency specified by a respective one of first and second schedules which are different, which are respectively utilized under first and second operational conditions which are different, and which each define said selected frequency as a function of the measured fluid temperature.

8. A method according to claim 7 wherein said selected frequency is increased as said measured fluid temperature increases.

9. A method according to claim 8 wherein according to said first schedule said frequency is increased from a first frequency to a second frequency as said fluid temperature increases from below to above −20° C., from said second frequency to a third frequency as said measured fluid temperature increases from below to above −10° C., and from said third frequency to a fourth frequency as said measured fluid temperature increases from below to above 0° C., and wherein according to said second schedule said selected frequency is increased from a fifth frequency to a sixth frequency as said measured fluid temperature increases from below to above −15° C., and from said sixth frequency to a seventh frequency as said measured fluid temperature increases from below to above −5° C.

10. A method as recited in claim 9 wherein said first frequency is 12.5 Hz, wherein said second frequency and said fifth frequency are each 25 Hz, wherein said third frequency and said sixth frequency are each 50 Hz, and wherein said fourth frequency and said seventh frequency are each 100 Hz.

11. A method according to claim 7 wherein said step of adjusting said selected frequency includes the step of measuring the velocity of a vehicle in which said gear change mechanism is disposed and includes, under third operational conditions different from said first and second operational conditions, the step of setting said selected frequency to a reduced frequency which is less than a maximum frequency specified by said first and second schedules, said third operational conditions including the measured fluid temperature and the measured vehicle velocity being above respective predetermined values.

12. A method according to claim 11 including the step of detecting whether a clutch of said gear change mechanism is fully engaged, said third operational conditions including said clutch being fully engaged.

13. A method according to claim 11 wherein said reduced frequency is approximately half of said maximum frequency.

14. A method according to claim 7 wherein said step of adjusting said selected frequency includes the step of providing hysteresis in said selected frequency by using a first frequency value until said measured fluid temperature exceeds a first predetermined temperature and by thereafter using a second frequency value different from said first frequency value until said measured fluid temperature is below a second predetermined temperature less than said first predetermined temperature.

15. A method of controlling a gear change mechanism responsive to the fluid pressure in a fluid line using electrically actuable valve means for selectively supplying a pressurized fluid to said fluid line, comprising the steps of supplying to said valve means an electrical signal at a selected frequency to control actuation of said valve means, varying a duty ratio of said electrical signal to adjust the fluid pressure within said fluid line, measuring the temperature of the fluid, and adjusting said selected frequency in response to variation of the measured temperature of the fluid, said step of adjusting said selected frequency including the step of providing hysteresis in said selected frequency by using a first frequency value until said measured fluid temperature exceeds a first predetermined temperature and by thereafter using a second frequency value different from said first frequency value until said measured fluid temperature is below a second predetermined temperature less than said first predetermined temperature.

16. A method according to claim 15 wherein said first frequency value is approximately half of said second frequency value.

17. A method according to claim 15 wherein said first predetermined temperature is approximately 3° C. higher than said second predetermined temperature.

* * * * *